US007411590B1

(12) United States Patent
Boyd et al.

(10) Patent No.: US 7,411,590 B1

(45) Date of Patent: Aug. 12, 2008

(54) MULTIMEDIA FILE FORMAT

(75) Inventors: Martin Boyd, Marina del Rey, CA (US); Stephen Sheeler, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 10/914,979

(22) Filed: Aug. 9, 2004

(51) Int. Cl.
*G06T 13/00* (2006.01)

(52) U.S. Cl. ........................ 345/473; 345/419; 345/440; 345/474; 345/475; 703/3; 703/11; 715/762

(58) Field of Classification Search ................. 345/473, 345/440, 426, 419, 474, 475; 703/3, 11
See application file for complete search history.

(56) References Cited

U.S. PATENT DOCUMENTS 5,261,041 A 11/1993 Susman
5,583,981 A 12/1996 Pleyer
5,588,098 A 12/1996 Chen et al.
5,717,848 A 2/1998 Watanabe et al.
5,731,819 A 3/1998 Gagne et al.
5,835,692 A 11/1998 Cragun et al.
5,835,693 A 11/1998 Lynch et al.
5,883,639 A 3/1999 Walton et al.
6,011,562 A 1/2000 Gagne et al.
6,045,446 A 4/2000 Ohshima
6,115,053 A 9/2000 Perlin
6,144,381 A 11/2000 Lection et al.
6,154,601 A 11/2000 Yaegashi et al.
6,266,053 B1 * 7/2001 French et al. ............ 715/500.1
6,271,863 B1 8/2001 Bose et al.
6,310,621 B1 10/2001 Gagne et al.
6,353,437 B1 3/2002 Gagne
6,512,522 B1 1/2003 Miller et al.
6,525,736 B1 2/2003 Erikawa et al.
6,573,896 B1 6/2003 Ribadeau Dumas et al.
6,615,199 B1 * 9/2003 Bowman-Amuah .......... 706/50
6,636,242 B2 10/2003 Bowman-Amuah
6,664,986 B1 12/2003 Kopelman et al.
6,714,201 B1 3/2004 Grinstein et al.
6,756,984 B1 6/2004 Miyagawa
6,760,030 B2 7/2004 Hiroike et al.
6,967,654 B2 11/2005 Steed
7,027,055 B2 4/2006 Anderson et al.
7,050,955 B1 * 5/2006 Carmel et al. .................. 703/6

(Continued)

OTHER PUBLICATIONS

Wikipedia, "Abstract factory pattern," Mar. 10, 2006, [online] [Retrieved on Apr. 5, 2006] Retrieved from the Internet <URL: http://en.wikipedia.org/wiki/Abstract_factory_pattern>.

(Continued)

*Primary Examiner*—Kimbinh T Nguyen
(74) *Attorney, Agent, or Firm*—Fenwick & West LLP

(57) ABSTRACT

An automatically readable medium encoded with a time-based media file which comprises a factory object which uniquely identifies the instantiation of an object of a particular type. The factory object can be one of the following: a scene object; a behavior object; or a filter object. The scene object can include at least one of the following: global setting for the scene; or the last settings used to render to a resulting time-based media file. The scene object can ultimately contain a reference to media used by the object. A scene object can include a reference to another scene object.

26 Claims, 7 Drawing Sheets

U.S. PATENT DOCUMENTS

| | | | | |
|---|---|---|---|---|
| 7,055,168 | B1 * | 5/2006 | Errico et al. | 725/46 |
| 2001/0030647 | A1 | 10/2001 | Sowizral et al. | |
| 2002/0003540 | A1 | 1/2002 | Unuma et al. | |
| 2002/0112180 | A1 | 8/2002 | Land et al. | |
| 2003/0043191 | A1 * | 3/2003 | Tinsley et al. | 345/762 |
| 2004/0036711 | A1 | 2/2004 | Anderson | |
| 2004/0039934 | A1 | 2/2004 | Land et al. | |
| 2005/0091576 | A1 * | 4/2005 | Relyea et al. | 715/502 |
| 2005/0110964 | A1 * | 5/2005 | Bell et al. | 353/122 |
| 2005/0231512 | A1 * | 10/2005 | Niles et al. | 345/473 |
| 2005/0268279 | A1 | 12/2005 | Paulsen et al. | |

OTHER PUBLICATIONS

Wikipedia, "Class (computer science)," Apr. 4, 2006, [online] [Retrieved on Apr. 5, 2006] Retrieved from the Internet <URL: http://en.wikipedia.org/wiki/Class_%28computer_science%29>.

Wikipedia, "Object lifetime," Mar. 13, 2006, [online] [Retrieved on Apr. 5, 2006] Retrieved from the Internet <URL: http://en.wikipedia.org/wiki/Object_lifetime>.

Apple Computer Inc., "Motion Product Overview," Jun. 30, 2004, [online] [Retrieved on Sep. 5, 2005] Retrieved from the Internet <URL:http//images.apple.com/motion/pdf/Motion_P0_2004615.pdf>.

Kurtenbach et al., "The Design of a GUI Paradigm based on Tablets, Two-hands, and Transparency," CHI 97, Mar. 22, 1997, pp. 35-42, Atlanta, GA.

"Scalable Vector Graphics (SVG 1.1 Specification, Chapter 19)," Jan. 14, 2003, [online] [Retrieved on Sep. 5, 2005] Retrieved from the Internet <URL:http://www.w3.org/TR/SVG/animate.htm#animation-mod>.

"Using Director MX2004 Behaviours," Feb. 9, 2004, [online] [Retrieved on Sep. 6, 2005] Retrieved from the Internet <URL:http://www.macromedia.com/support/documentation/en/director/index.htm#manuals>.

"Woodland Games: Carpet Golf," Dec. 31, 1998, [online] [Retrieved on Aug. 4, 2006] Retrieved from the Internet <URL:http://www.woodlands-junior.kent.sch.uk/Games/lengame/cgolf/>.

PCT International Search Report and Written Opinion, PCT/US2005/012735, Aug. 31, 2006.

Altman, R. B., "Applying Preset Animations" in Visual QuickStart Guide Power Point 2000/98, ProQuest Safari Books, Peachpit Press, May 7, 1999, 7 pages [online] Retrieved from the Internet: <URL: http://proquest.safaribooksonline.com/0201354411>.

Lammers, J., et al., "Maya 4.5 Fundamentals: Particles," Jan. 14, 2003, 12 pages, [online] [retrieved on Feb. 12, 2007] Retrieved from Proquest Safari Books Online: <URL: http://proquest.safaribooksonline.com/0735713278>.

* cited by examiner

Motion File Format

Fig. 4 Scene Node Factory Object

FIG.5 BEHAVIOR FACTORY OBJECT

Fig. 6 FILTERS FACTORY OBJECT

MULTIMEDIA FILE FORMAT

CROSS-REFERENCE TO RELATED APPLICATIONS

This application is related to the following commonly owned and co-pending U.S. patent applications, the disclosures of which are incorporated herein by reference:

U.S. patent application Ser. No. 10/826,973, for "Animation of an Object Using Behaviors", filed Apr. 16, 2004.

U.S. patent application Ser. No. 10/826,878, for "Gesture Control of Multimedia Editing Applications", filed Apr. 16, 2004.

U.S. patent application Ser. No. 10/826,429, for "Editing Within Single Timeline", filed Apr. 16, 2004.

U.S. patent application Ser. No. 10/826,234, for "User Interface Control for Changing a Parameter", filed Apr. 16, 2004.

BACKGROUND OF THE INVENTION

1. Field of the Invention

The present invention relates to the area of storage of files, specifically time-based media (multimedia) files, in a tangible medium.

2. Background of the Invention

Prior art multimedia files have suffered from a variety of shortcomings. Manufacturers have tended to develop their own internal file formats unique and optimized to their products. They are often represented in binary. Generally, they are designed to be used by known application programs (their own) for known purposes, those supported by their applications. As a result, such files have suffered not only from incompatibility among each other, but also have suffered from the shortcoming that they are inextensible.

Web browsers have long had the ability to handle data which the underlying browser does not know how to process. Web browsers typically parse HTML and its variants (HTML+) to present web pages to a user and have had facilities implemented for handling disparate file data types in an HTML file through a MIME registry. If a web browser encounters a data type in a HTML file that it is processing that it cannot handle within the browser, then it makes an attempt to find a plug-in or helper application which can process the data outside the domain of the browser.

XML has recently grown into favor for describing data generally which, unlike HTML, is not necessarily to be presented to a user, for example, on a display or on hardcopy. XML, unlike HTML, is extensible and can have user-specified tags asscociated with it. Some multimedia authoring applications (e.g. Final Cut Pro 5 from Apple Computer, Inc. of Cupertino, Calif. [hereinafter "Apple"]), have added facilities for basic file interchange using XML. However, to date, no multimedia authoring applications have stored their native file format in XML with the ability to handle a variety of data types, including those of which the application has no ability to process.

SUMMARY OF THE INVENTION

An automatically readable medium encoded with a time-based media file which comprises a factory object which uniquely identifies the instantiation of an object of a particular type. The factory object can be one of the following: a scene object; a behavior object; or a filter object. The scene object can include at least one of the following: global setting for the scene; or the last settings used to render to a resulting time-based media file. The scene object can ultimately contain a reference to media used by the object. A scene object can include a reference to another scene object.

BRIEF DESCRIPTION OF THE DRAWINGS

The accompanying drawings illustrate several embodiments of the invention and, together with the description, serve to explain the principles of the invention.

DETAILED DESCRIPTION

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. In particular the claim of copyright protection extends to code and pseudocode printed herein. All content contained and referred to herein is Copyright (C2004, Apple Computer, Inc., All Rights Reserved.

For illustrative purposes, the described embodiment of the present invention is described herein in the context of editing video clips. However, one skilled in the art will recognize that the techniques of the present invention can be embodied in any software application for editing media clips of any type, and is not limited to video editing. Specifically, the described embodiments of the present invention are implemented in a two-dimensional animation authoring application known as a motion graphics applications program. For the remainder of this disclosure, this embodiment is known as "Motion."

Figure 1:
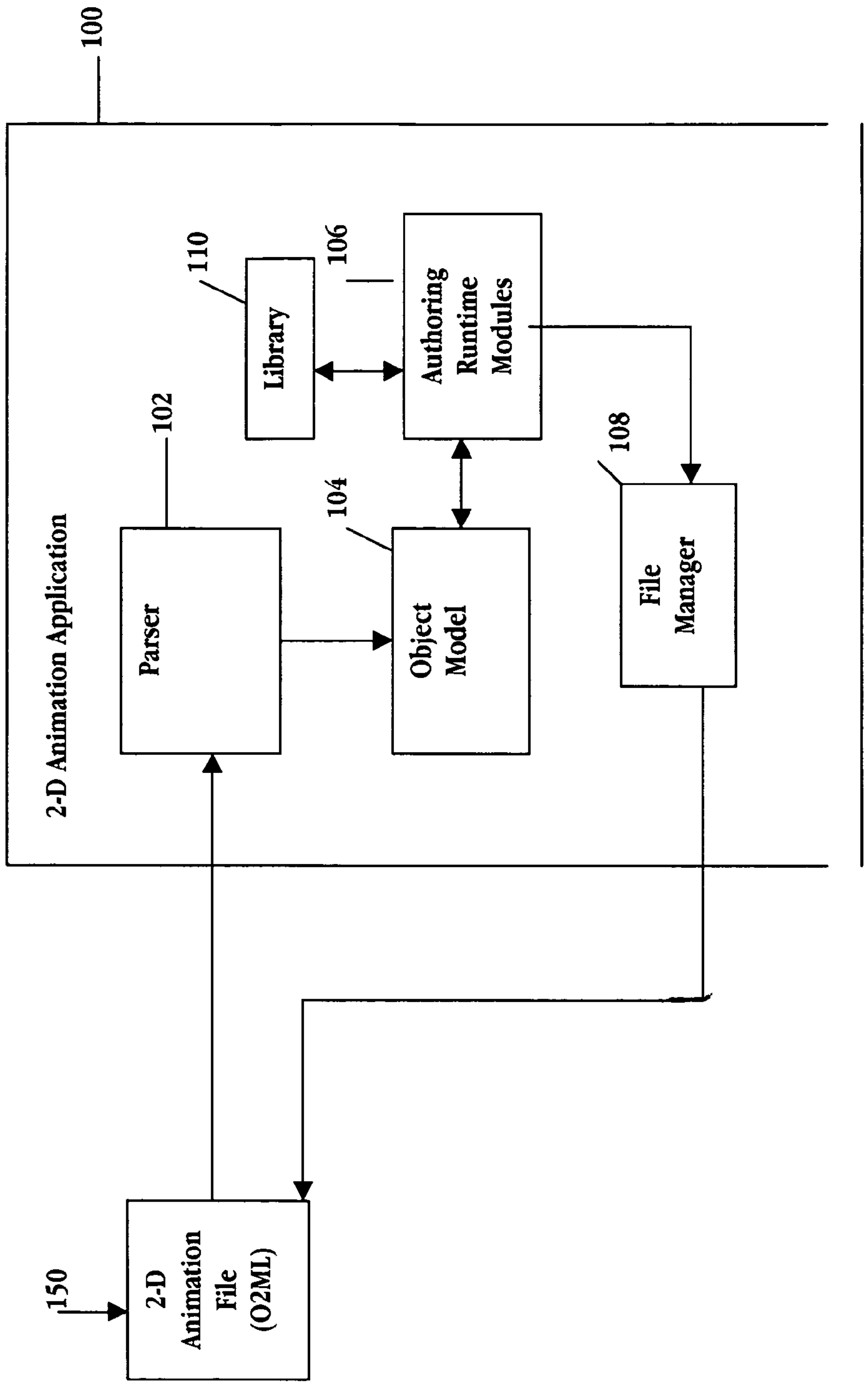
FIG. 1 shows the architecture of an embodiment of the present invention.

In this embodiment, Motion is implemented in object-oriented fashion. As shown in FIG. 1, the Motion application 100 (or a portion thereof depending on the underlying machine state) is resident in a computer system memory. Motion uses an internal object model 104 to represent the various data structures necessary for representing 2-D motion graphics content and their current state. This object model is in communication with a set of runtime authoring modules 106 which operate on and modify the object model 104 during authoring.

The object model 104 is initially derived from instantiation of various objects during runtime as specified by a two-dimensional animation file (hereinafter "Motion file") 150. Motion file 150 is represented in this embodiment using an enhanced version of XML (hereinafter "OZML"). The details of this will be fully explained below. Motion file 150 is resident in some type of computer readable storage, typically, a persistent writeable medium such as a mass storage device like a hard disk drive for use from session to session. Motion file 150 is parsed during runtime by parser 102 in Motion 100 and is used to create the previously-mentioned object model 104. Moreover, as the object model 104 is modified within Motion 100, changes are written back to Motion file 150 via a file manager 108. Finally, authoring/runtime module 106 is in communication with a library 110 into which objects or portions of objects can be stored. These objects (or portions) can be used to populate object model 104 or portions of object model 104 can be used to populate library 110 for later re-use.

Motion 100 is a two-dimensional graphics animation authoring application. From a user's perspective, a Motion project is comprised of layers which may be presented in a timeline fashion. Layers may contain other layers, behaviors, effects, filters, and eventually refers to the underlying media which is being processed. An example of a timeline presentation of a Motion project is shown as 200 in FIG. 2.

Figure 2:
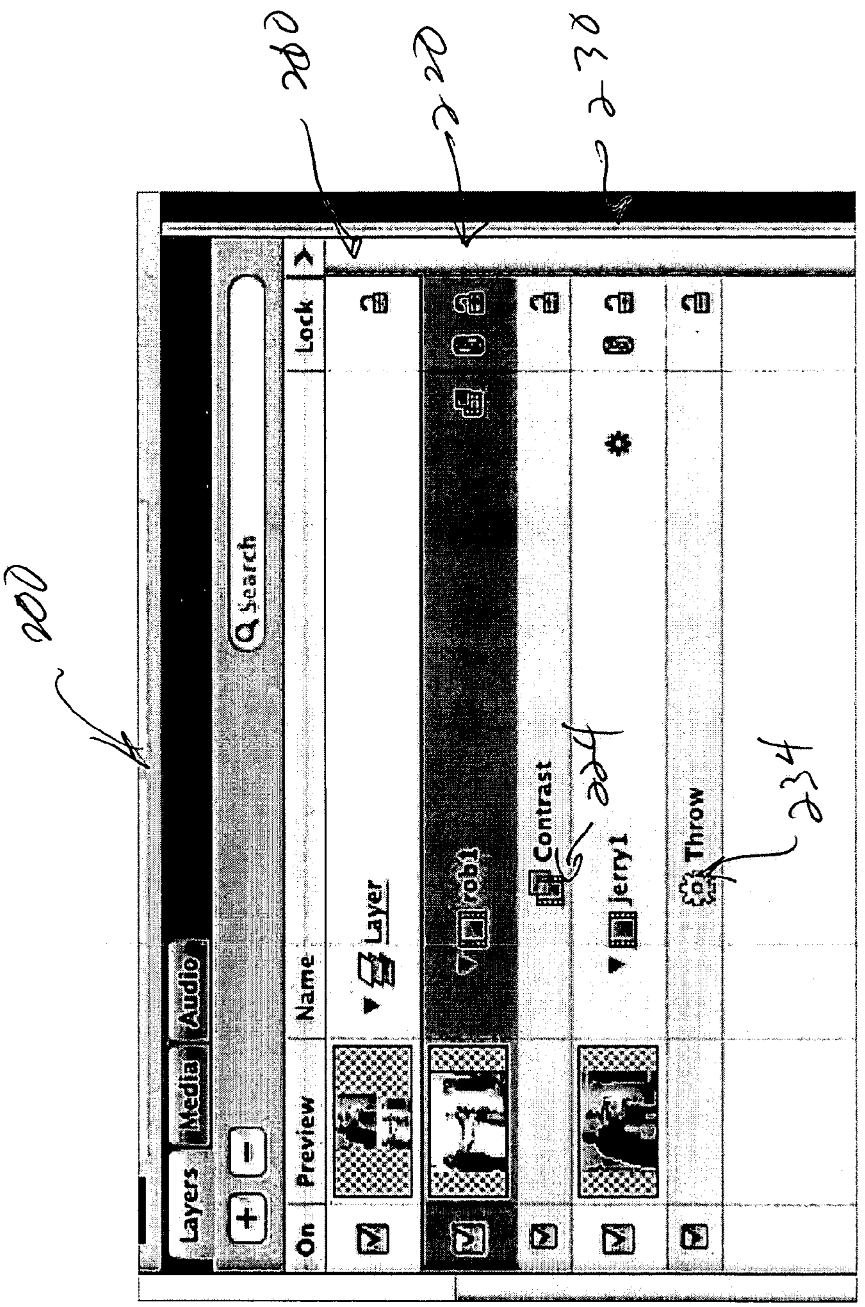
FIG. 2 shows a user interface of an embodiment of the present invention.

In the example shown in FIG. 2, a layer 210 in the project 200 contains two other layers rob1 220 and jerry1 230, which reference separate media clips. Each of the layers 220 and 230 also have associated filters or effects 224 and 234 associated with them. In the case of 224, a contrast filter is applied to the media clip for the layer 220, and a throw behavior 234 is applied to the media clip associated with layer 230. Both filters and behaviors have parameters associated with them which modifies the filters or effects. For example, parameters may be specified for contrast 224 indicating amount of contrast desired.

Layer 210 is a scene object in Motion's object model. Scene objects are the basic object in Motion. Scene objects may be layers, as in this case, which is a type of scene object that contains other scenes. Each scene object also encodes its behaviors and filters as sub-elements as shown.

File Format

Figure 4:
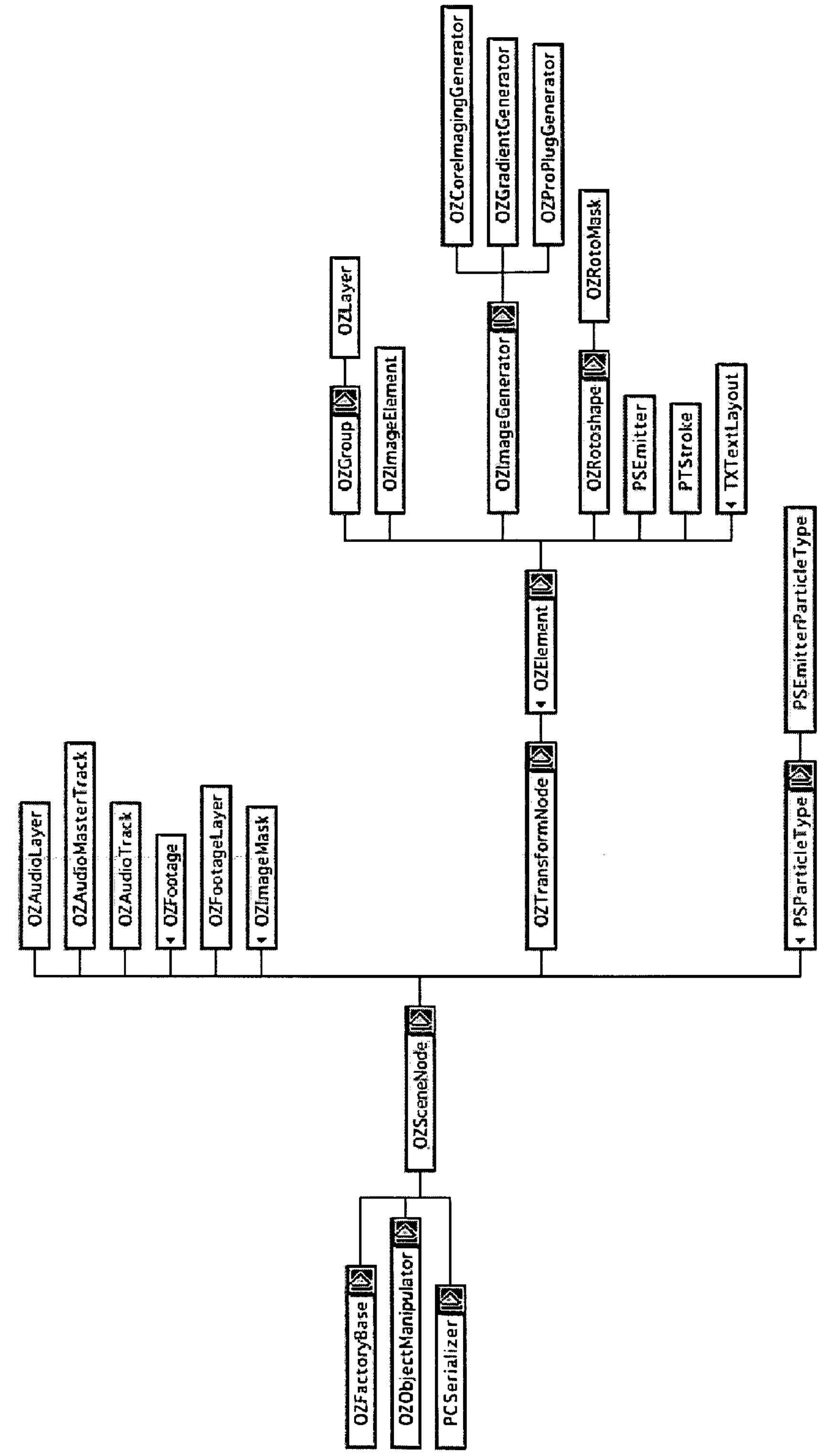
FIGS. 4-6 show object graphs of an embodiment of the present invention.
Figure 5:
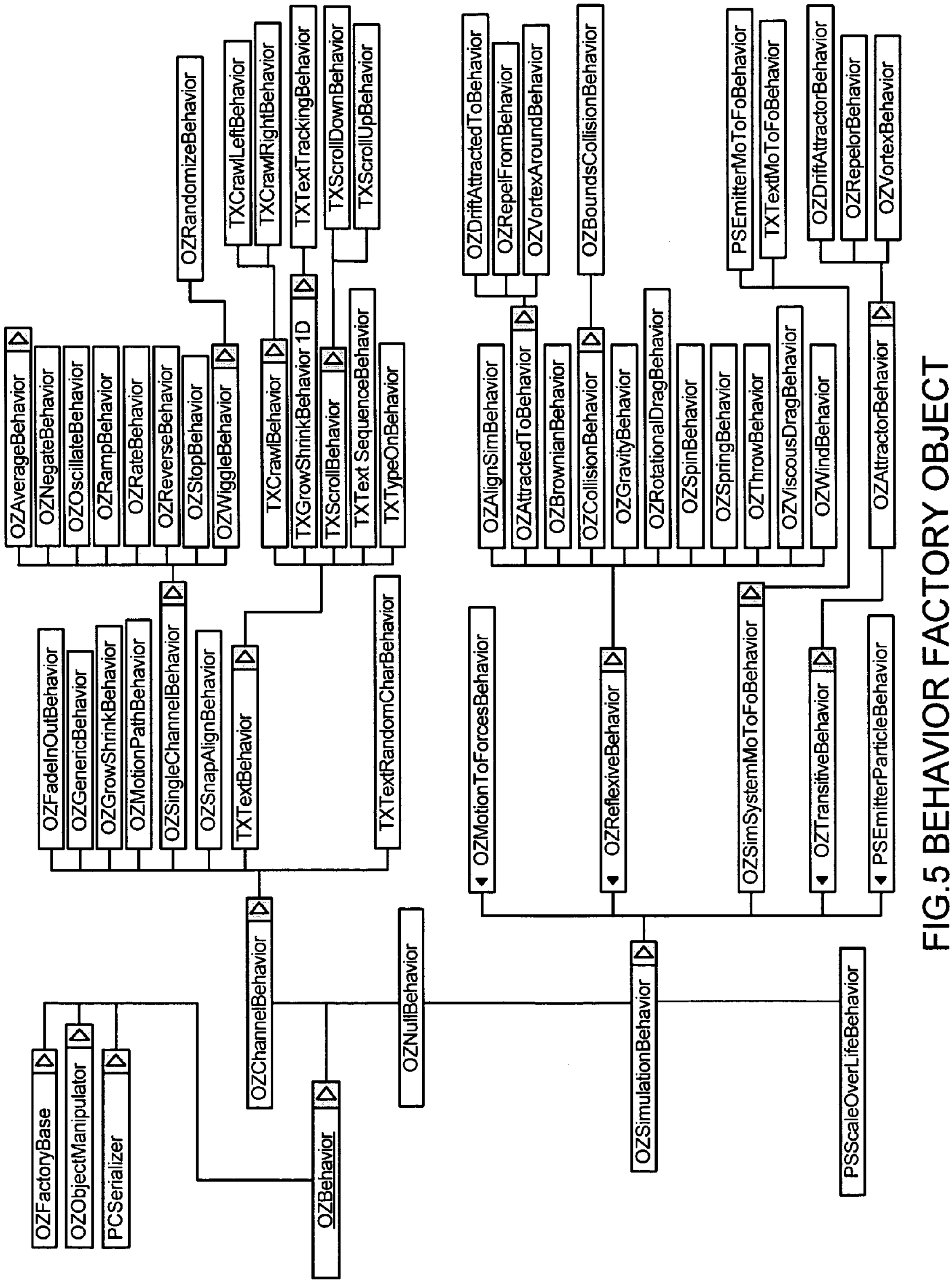
Figure 6:
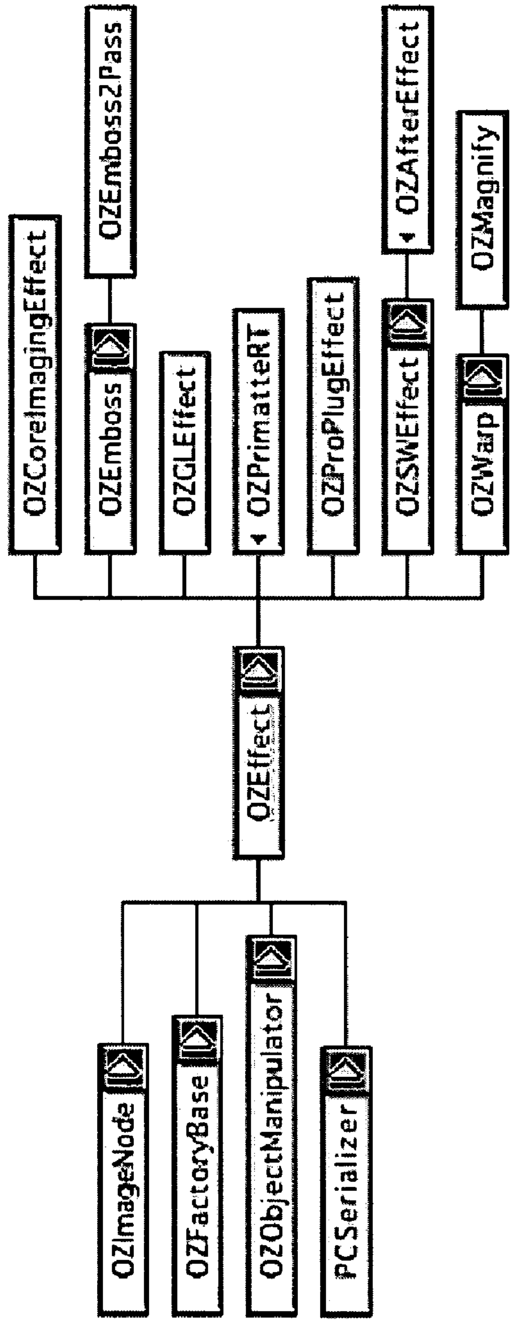

Motion uses the concept of factories to abstract the creation of scene objects. Factories are registered at run-time by both Motion and also by plugs it can load. Each factory is identified by a unique 128 bit number called a Universally Unique Identifier (UUID). In this embodiment, there are 4 specified categories of factories scene nodes, behaviors, filters and styles. Each factory also has the UUID of its parent so the factories can be organized in an inheritance hierarchy that matches the inheritance in the C++ programming language. This is designed to allow maximum flexibility in the scene object graph used by Motion, plugins can freely add new types of objects and Motion will accept them even though it's unaware of the exact details of those objects. The object graphs shown in FIGS. 4-6 show example hierarchies which could be used in a current implementation of Motion for scene nodes, behaviors and filter respectively.

The OZML file format of this embodiment of the present invention handles this desired flexibility. Standard XML is limited because it tends to be rigidly defined and in most applications can't be changed once they have been implemented. To get around this rigidity, Motion saves the factory information for all objects used in the scene when the file is read. Then, when it is parsing the file, it can associate a factory to a given element in the file. Subsequently, it uses the factory to instantiate an instance of that object and then pass control to that object to allow it to parse any XML sub-elements contained therein. In the absence of the particular factory for the object which is read, Motion can simply ignore the object or perform some other recovery operation.

Figure 3:
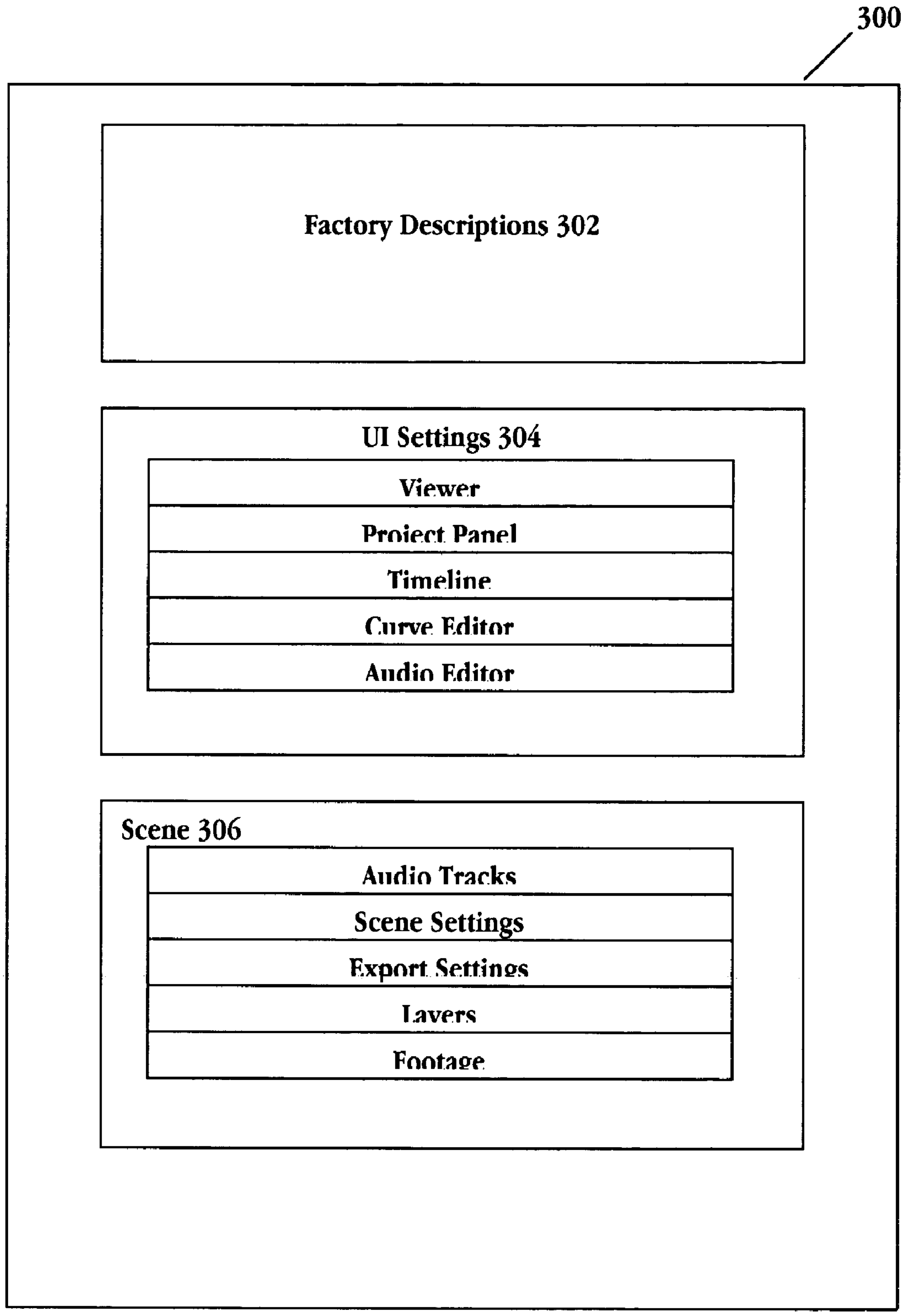
FIG. 3 shows a layout of an OZML file of an embodiment of the present invention.

The basic OZML file layout 300 is shown in FIG. 3 as follows:

Factory descriptions 302

Settings for various user interface components 304 viewer projectPanel timeline curveeditor audioeditor

Scene 306 sceneSettings—global settings for the scene exportSettings—last settings used to render to a resulting multimedia playback file Layers Audio Tracks Footage used in the scene (footage is referenced by ID and may be used multiple times by other objects in the scene).

A generic scene node instantiation in Motion looks like this:

<scenenode name="rob1" id="10026" factoryID="1">

This tells Motion to create a scene node using the factory with ID1 defined at the tope of the file. Motion also uses a shorthand version of this for common known types of objects so that it can simplify the file and avoid writing the factory information (as it is already known), some examples of this are:

<layer name="Layer" id="10014">

<footage name="Media Layer" id="10018">

<clip name="rob1" id="10025">

<audioTrack name="rob1" id="10028">.

Each scene node can contain other scene nodes (in the case of layers). Each scene node also encodes its behaviors and filters as sub-elements.

All objects can have any number of parameters that are organized hierarchically. For instance, the x, y position of a node is specified like this:

```
<parameter name="Position" id="101" flags="4112">
<parameter name="X" id="1" flags="16" value="−178.5555649"/>
<Parameter name="Y" id="2" flags="16" value="118"/>
</parameter>
```

All parameters use the 'id' field to find the correct parameter when loading, the name entry is to make the file more readable. If the parameter contains a constant value it will be saved in a single line as above. If the parameter is keyframed then keyframing information is encoded as sub elements. An example OZML file is shown in Appendix A.

Appendix A is an example OZML file formatted in accordance with one embodiment of the present invention. Appendix A corresponds with the project illustrated in the user interface of FIG. 2. As is typical in many markup languages, tagged elements are delimited by the pattern <TAG NAME> and </TAG NAME> throughout the file. Within each tag, settings specified by parameters are contained within the delimited information. In accordance with the format previously described, Appendix A has 4 factory descriptions—Image, Master, Throw, and a filter corresponding with the objects used for a scene. This is followed by the viewer, project panel, timeline, curveeditor and audioeditor user interface settings for the project. Within each tag, parameters are specified for the user interfaces to view the project on the user display. Subsequently, the file contains the settings for the project and for export respectively. In one embodiment, the export is for export of a resulting media file to the QuickTime multimedia format for viewing in applications other than those provided in implemented embodiments, but any multimedia format may be the target of the export in other embodiments.

Subsequent to the export settings, layers for the scene are specified. As shown in FIG. 2, the scene node information for the scene "rob1" is specified. It is also followed by a series of parameters for the scene node. Subsequently, a "contrast" filter is specified for the rob1 scene node. Subsequent to the settings for the rob1 scene node, the additional scene node "jerry1" is specified along with its parameters. Subsequently, as shown on FIG. 2, the "throw" behavior is declared.

Subsequent to the specification of the scene nodes and their corresponding parameters and filters, audio layer information is specified. Finally, the media data (footage) is specified for the rob1 and jerry1 scenes. Footage is de-coupled from the scene structure information specified in the file so that multiple scenes can reference the same media information. This is done by referring to the same clip id of the media information desired. These are referenced by <clip></clip> tags. Again, a number of parameters for the clips are also defined FIGS. 4-6 are examples of object graphs generated in one embodiment by the processing of an OZML file. As can be appreciated, different object graphs can be generated in various implementations of the present invention. These are shown for illustrative purposes only and do not limit the present invention. While a detailed discussion of these object graphs is not presented, one skilled in the art can appreciate that given a file structured in the manner described, factory objects could be created with these or similar structures.

As can be appreciated by viewing these object graphs, children objects inherit the characteristics of their base or parent classes. In Motion, where factory objects are created, the children objects inherit the UUID of their parents, even when factories are created of which the application has no knowledge. A child object, even of an unknown class, will be in an inheritance relationship at some level with known classes of objects. A method which is therefore supported by all objects which can be instantiated in Motion in one which obtains the UUID of a parent factory object (e.g. GetParentUUID( ) or similar). By invocation of this method on unknown factory classes in iterative fashion up the object graph, Motion can eventually reach a known factory object class. This will allow Motion to handle unknown factory objects in a way appropriate to the type of object, even if the actual type of the object is unknown. For example, with reference to FIG. 5, if an object is of type "TXScrollUpBehavior," then even if that type and its parent class TXScrollBehavior is unknown, then Motion can handle it according to data appropriate for a known base class, e.g., TXTextBehavior.

Another advantage of the Motion embodiment is that the object-oriented nature of the architecture and file format allow easy re-use of factory classes, even those that are created by the user of the system. In this embodiment of the present invention, objects can be dragged onto visible project files by a user from a library of objects 110. In essence, these library objects that are stored in library 110 are snippets of the object graphs. These are eventually reflected, when the project is written, in the resulting file format for the project (e.g. 150). Likewise, objects (and by reference, their factory objects) can be dragged from a project onto the library for re-use later in the project or another project.

Figure 7:
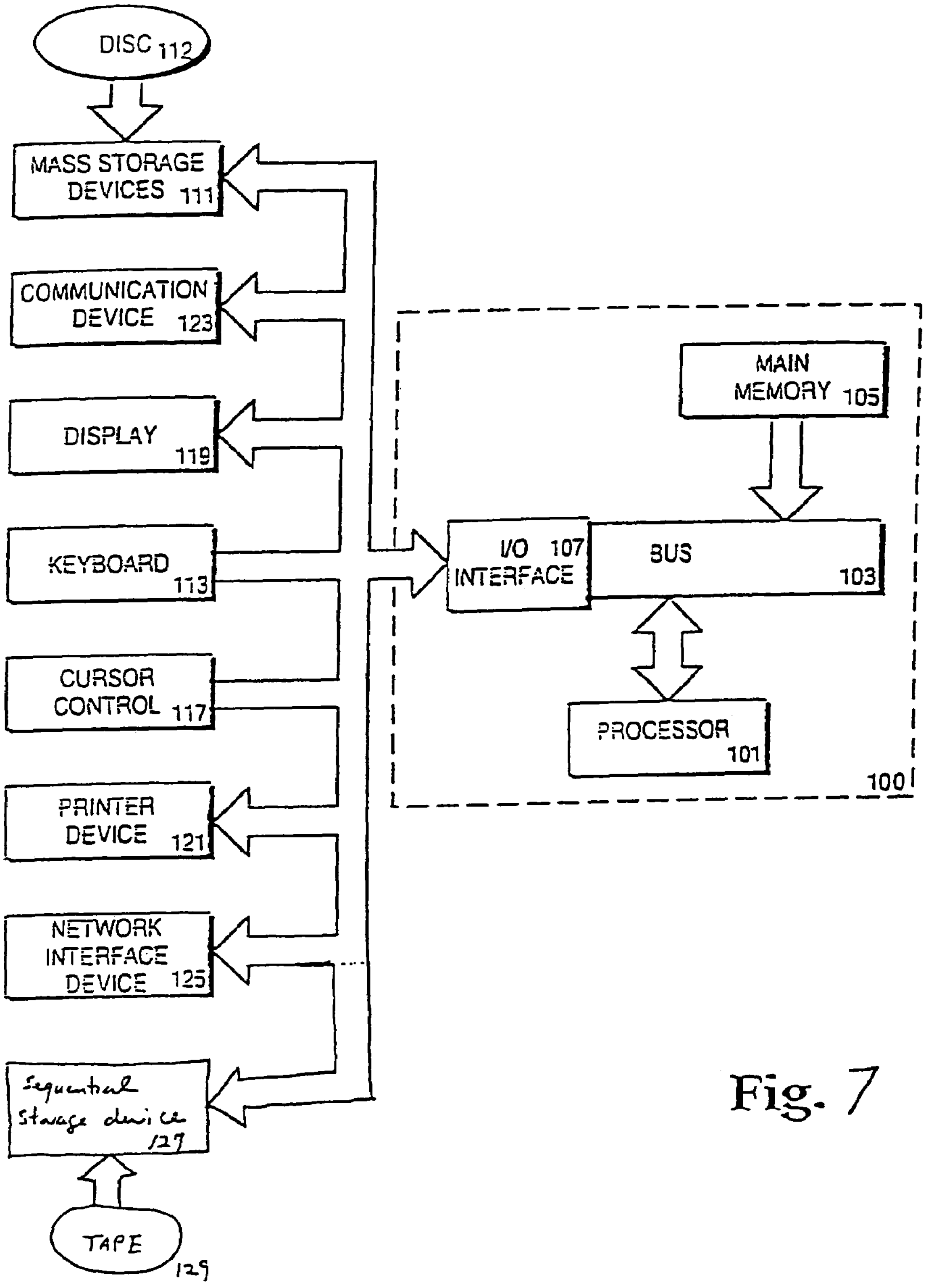
FIG. 7 shows a system upon which an embodiment of the present invention may be implemented.

In one embodiment, the present invention is implemented as part of a software application for video editing and/or video compositing as previously described. The software application is installed on a personal computer such as a Macintosh brand computer (e.g. PowerMac G5) running the MacOS X operating system available from Apple. The personal computer includes a processor, memory, input devices such as keyboard and mouse, and an output device such as a display screen. An example system is illustrated in FIG. 7. At a minimum, such a system 100 contains a processor 101 and memory 105 in communication in some manner (e.g. through a bus 103). Depending on implementation, system 100 may be coupled to one or more peripheral devices 111-129 as shown via one or more input/output interface(s) 107. In one embodiment, software embodying the application program of the present invention is provided on a computer-readable medium such as a disk 112. Also, a file containing data formatted in the manner described herein may also be stored and provided on disk.

One skilled in the art will recognize that these Figures are merely examples of the operation of the invention according to one embodiment, and that other user interface arrangements and modes of operation can be used without departing from the essential characteristics of the invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-readable medium encoded with a time-based media file comprising a factory object which uniquely identifies the instantiation of an object of a particular type wherein said factory object is one of the following:

an object that represents a scene, wherein the scene object comprises a reference to media used by the scene object;

an object that represents a behavior; or an object that represents a filter.

2. The computer-readable medium of claim 1 wherein said scene object includes at least one of the following:

global setting for the scene; or last settings used to render to a resulting time-based media file.

3. The computer-readable medium of claim 1 wherein said scene object includes another scene object.

4. A computer-readable data structure, encoded on a computer-readable medium, for representing a multimedia file comprising factory objects which uniquely identify the instantiation of an object of a particular type, the structure comprising:

factory descriptions for describing factory objects;

an object that represents a scene, wherein the scene object comprises a reference to media used by the scene object; and settings for user interface parameters specifying how the scene object is displayed.

5. The data structure of claim 4, wherein the settings for the user interface parameters are readable by user interface elements comprising at least one of a viewer, project panel, timeline, curveeditor, and audioeditor for presentation to a user.

6. The data structure of claim 4, wherein the settings for the user interface parameters are writeable by user interface elements comprising at least one of a viewer, project panel, timeline, curveeditor, and audioeditor.

7. The data structure of claim 4, wherein the scene object comprises at least one of audio tracks, scene settings, export settings, layers, and footage used in the scene.

8. The data structure of claim 7, wherein the scene settings comprise global settings for a scene.

9. The data structure of claim 7, wherein the scene settings comprise last settings used to render to a resulting multimedia file.

10. The data structure of claim 4, wherein a factory description comprises an image.

11. The data structure of claim 4, wherein a factory description comprises a master.

12. The data structure of claim 4, wherein a factory description comprises a throw.

13. The data structure of claim 4, wherein a factory description comprises a filter.

14. The data structure of claim 7, wherein the export settings specify a multimedia format for viewing a resulting multimedia file.

15. The data structure of claim 14, wherein the multimedia format comprises a QuickTime format.

16. The data structure of claim 7, wherein the layers comprise scene objects.

17. The data structure of claim 7, wherein the layers comprise filter objects.

18. The data structure of claim 7, wherein the layers comprise behavior objects.

19. The data structure of claim 4, wherein the scene object is associated with a behavior.

20. The data structure of claim 4, wherein the scene object is associated with a filter.

21. The data structure of claim 19, wherein the behavior comprises a throw behavior.

22. The data structure of claim 20, wherein the filter comprises a contrast filter.

23. The data structure of claim 7, wherein the footage can be used by multiple scene objects.

24. The data structure of claim 4, wherein the user interface parameters are organized hierarchically.

25. A method for processing a multimedia data file, the method comprising:

reading a multimedia data file organized according to a data structure comprising:

factory descriptions for describing factory objects;

an object that represents a scene, wherein the scene object comprises a reference to media used by the scene object; and settings for user interface parameters specifying how the scene object is displayed;

parsing the data file according to the data structure; and displaying the data file.

26. A computer program product comprising:

a computer-readable medium having computer program code embodied therein for processing a multimedia data file, the computer program code adapted to:

read a multimedia data file organized according to a data structure comprising factory descriptions for describing factory objects;

an object that represents a scene, wherein the scene object comprises a reference to media used by the scene object; and settings for user interface parameters specifying how the scene object is displayed;

parse the data file according to the data structure; and display the data file.

* * * * *